Sept. 23, 1969  M. B. ALLEN  3,468,291
AUTOMATIC FEEDER FOR ANIMAL CAGES
Filed Jan. 17, 1967  2 Sheets-Sheet 1
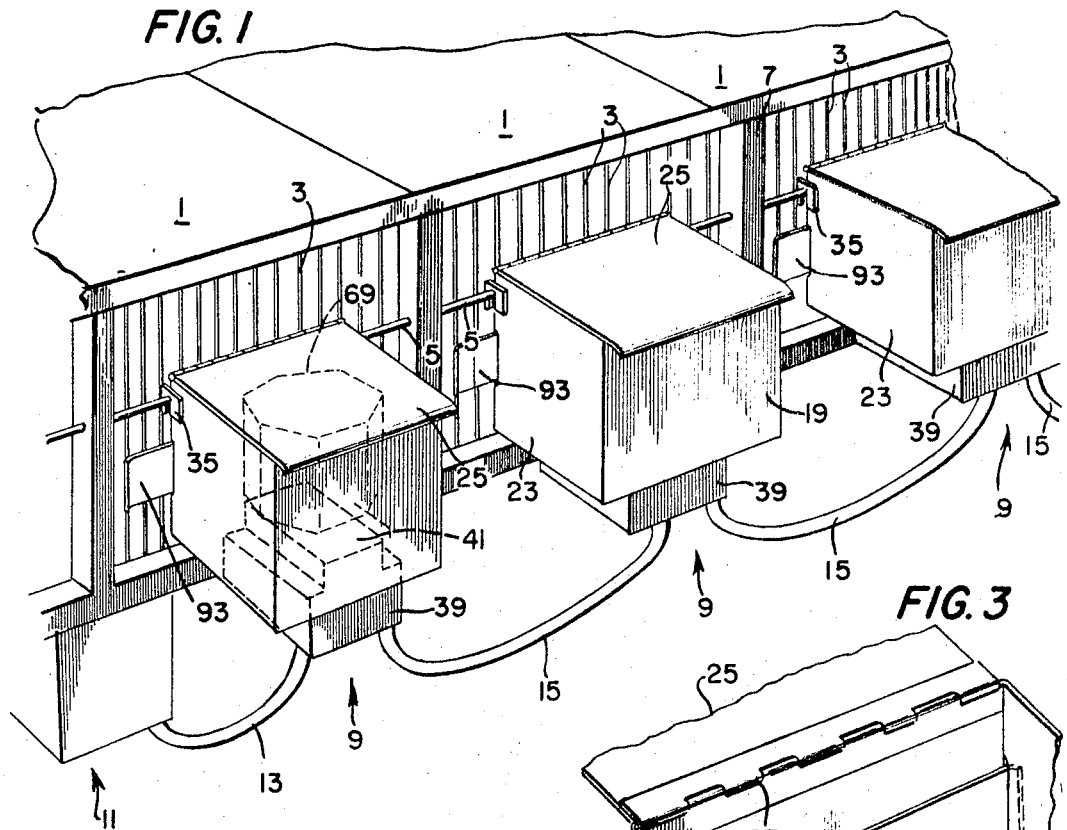
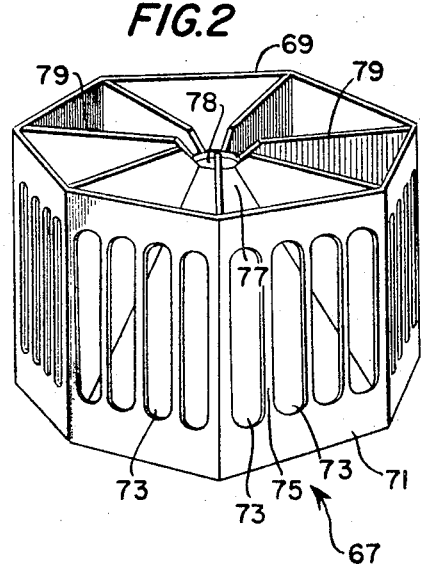
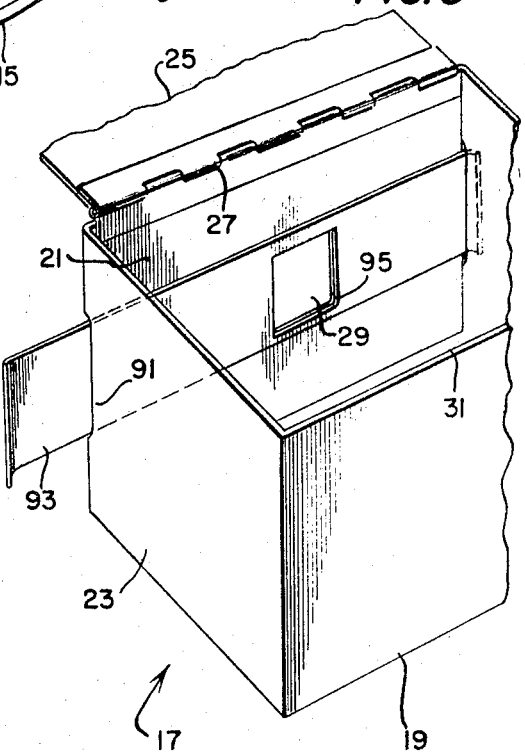
INVENTOR.
Maurice B. Allen
BY
Peck & Peck
ATTORNEYS Sept. 23, 1969  M. B. ALLEN  3,468,291
AUTOMATIC FEEDER FOR ANIMAL CAGES
Filed Jan. 17, 1967  2 Sheets-Sheet 2
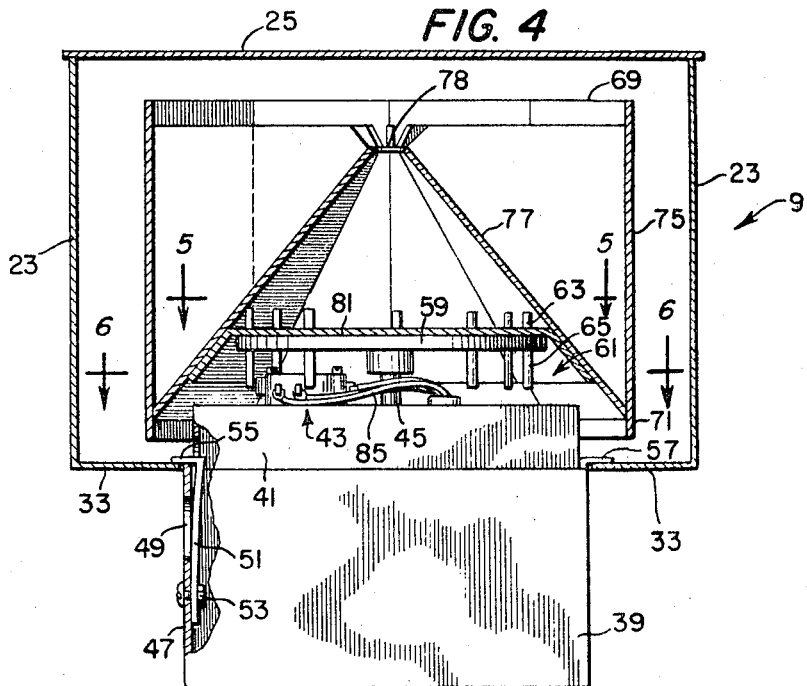
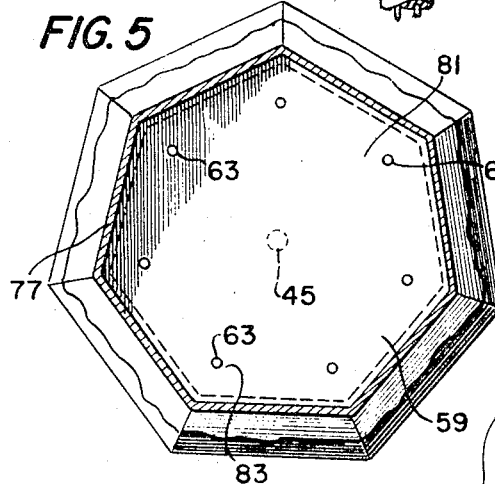
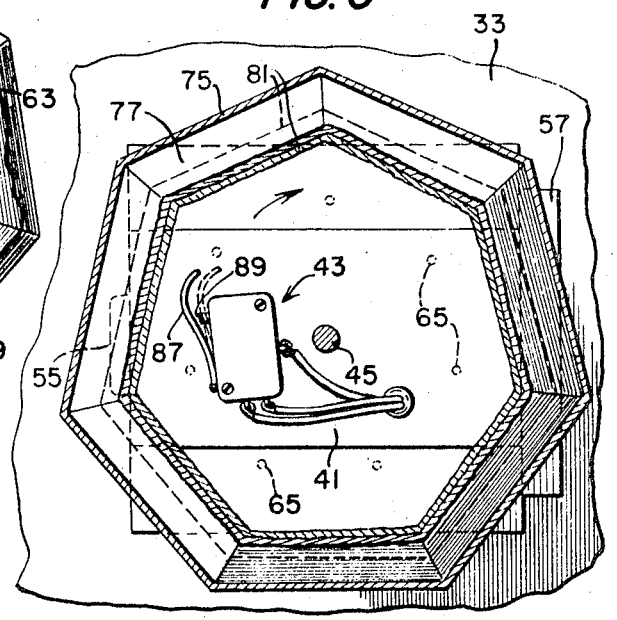
INVENTOR.
Maurice B. Allen
BY
Peck + Peck
ATTORNEYS

United States Patent Office 3,468,291
Patented Sept. 23, 1969

3,468,291
AUTOMATIC FEEDER FOR ANIMAL CAGES
Maurice B. Allen, 14510 Old Columbia Road,
Burtonsville, Md. 20730
Filed Jan. 17, 1967, Ser. No. 609,902
Int. Cl. A01k 5/02
U.S. Cl. 119—51.12                                11 Claims

ABSTRACT OF THE DISCLOSURE

A muliple rotating bin, for dispensing or presenting feed to small animals in cages. The bins are indexed at predetermined time intervals to successively present feed for consumption.

---

This invention relates broadly to the area of animal feeders, and in its more specific aspects it relates to an animal feeder provided with a series of individual feed bins, each of which is adapted to contain sufficient feed for a predetermined period, and the invention further includes means whereby the feeder is automatically actuated to bring the next adjacent bin into animal feeding position following the predetermined time period in which the animal may consume the allotted amount of feed in the feeding positioned bin; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

My automatic feeder has been especially designed for use in animal research laboratories or the like, however, it is to be distinctly understood that it is not my intention to so limit the use of this invention, for it involves versatile characteristics which provide for its use as a feeder in fields remote from animal research work. While I shall describe this invention as being used in the animal research field, it will be understood that such description is qualified as pointed out above.

In animal research laboratories, where a substantial number of animals are being used in research work, it is conventional to provide a series of separate cages, one being provided for each animal undergoing research. It will be obvious, of course, that such plurality of animals must be properly fed, or fed in accordance with the particular type of research to which the animal is being subjected.

It will be appreciated that in such laboratories, where a plurality of animals are being tested under controlled conditions, that much time and labor is required to feed the animals in the manner required.

It is one of the prime objects of my invention to provide an automatic feeder which is adapted to be operatively positioned relative to an animal cage so that the animal will be automatically fed predetermined amounts of feed material in a predetermined time period. This automatic operation of the feeding of research, or the like, animals which I have developed will substantially reduce the number of persons required to feed such plurality of research, or the like, animals. Thus, it will be apparent that any research laboratory, or as a matter of fact any operation where it is necessary to feed animals, which is using my automatic feeders will find a substantial labor saving will result.

In the animal research field, as well as in any field where it is necessary to feed animals, it will be recognized that it is highly desirable, if not essential, that the animal be fed a predetermined amount of feed in a predetermined period. This requirement has been taken into account in the development of this automatic feeder, for it provides an assembly of automatic mechanisms therefor whereby, without the necessity of human intervention, the animal is fed this predetermined amount of food in a predetermined time period.

As this description proceeds it will become manifest that my automatic feeder eliminates human error which may well occur in the amount of food fed to an animal in a given time, and in so eliminating this possibility of human error it provides for accurate and certain distribution to the animal of the desired amount of food in a particular period. A further purpose of my invention resides in the provision of an automatic feeder, of the general character which I have described, which requires little or no maintenance attention and comprises an assembly which may be dismantled with facility as the need for replacement of parts, or the like, is required.

In designing this automatic feeder I have provided an arrangement and assembly which emphasizes and facilitates the access of the food to the caged animal, and I have also provided simple means for filling the feeder when the food material therein has been consumed, so that the time and labor required for this operation is substantially reduced.

Not only have I provided a simple arrangement for refilling the feeder with food but I have also provided simple means operable by the attendant when the feeder is being refilled to prevent access thereto by the caged animal during this refilling period.

A further purpose has been to provide this automatic feeder as a compact assembly which may be relatively inexpensively produced and operated.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a view in perspective illustrating several separate or individual cages each having a feeder device removably attached thereto.

FIG. 2 is a view in perspective of the rotary feeder and access cage.

FIG. 3 is a view in perspective showing the housing for the feeder and access cage which has been removed therefrom, and also disclosing the means which is operable to prevent animal access into the housing, parts of the housing being broken away.

FIG. 4 is a vertical elevational view of the entire assembly with parts thereof being shown in section.

FIG. 5 is a view taken on the line 5—5 of FIG. 4.

FIG. 6 is a view taken on line 5—5 of FIG. 4.

In FIG. 1 of the accompanying drawings I have illustrated a plurality of separate animal cages which I have designated by the numeral 1. While I have only shown three of such cages in this figure, it is, of course, to be understood that a battery of cages may consist of any number. The front wall of each cage is formed in a conventional manner by a plurality of spaced apart bars 3, and in this assembly I provide a horizontally disposed bar 5 which extends between and is fixed to vertical post members 7 which are positioned at the side edges of each cage, and the horizontally disposed bars 5 function as my automatic feeder mounting and supporting means. Mounted on each mounting and supporting rod 5 at the front of each cage, so that the caged animal may have access thereto, is an automatic feeder assembly which I have designated in its entirety by the numeral 9.

In a manner which will be described in detail hereinafter the actuation of each feeder 9 is automatic, and the actuation thereof is controlled by any suitable type of conventional electric timer designated generally by the numeral 11, the timer being electrically connected to the next adjacent automatic feeder 9, of a series of feeders, by an electric cable 13, and each adjacent feeder is also connected by an electric cable 15 so that the actuation of each feeder 9 is controlled by the timer 11.

Each automatic feeder 9 comprises a housing designated generally by the numeral 17, such housing comprising a front wall 19, a rear wall 21 and end walls 23. I provide a top 25 for the housing 17, such top being hinged in any suitable manner, as at 27, to the rear wall 21. Thus, an attendant may gain access to the interior of the feeder merely by opening the top 25 on its hinges 27. In the rear wall 21 substantially midway between the ends of the housing 17 and the top and bottom thereof, I provide an opening 29 for a purpose which will be hereinafter described. The bottom of the housing has an opening 31 therein which is dimensionally less than the width and length of the housing, for I have so constructed the lower end of the housing to provide inwardly directed flanges 33 which exetend inwardly from each end wall 23, from the front wall 19 and from the rear wall 21. Such flanges 33 function to support the motor housing unit, and certain of the operating assembly, in a manner which I shall describe in detail hereinafter. Each feeder 9 is provided with hooks 35 which are fixed to each end wall 23 and extend rearwardly therefrom and are adapted to hook over the horizontal mounting and supporting rods 5 as clearly illustrated in FIG. 1 of the drawings. It will now be apparent that each automatic feeder 9 is removably mounted on a rod 5, at the front of each cage so that the caged animal may have access to the feed material which is contained in the feeder by merely projecting his mouth and/or part of his head through the bars 3 of the front wall of each cage.

I provide, what I shall term, a motor and operating assembly unit for each feeder 9, and I have designated this unit in its entirety by the numeral 37. The major part of each such unit 37 is of generally the same configuration as the opening 31 in the bottom of the housing 17, the unit 37 being adapted, in the following manner, to be removably attached to the housing 17 with a portion thereof extending within the housing and remaining portion depending from the housing. Each unit 37 is of generally closed construction and the depending enclosed portion 39 thereof operatively mounts therein a conventional electric motor (not shown) the energization of which is controlled by the operation of the timer, such electric motor being electrically connected for energization by the timer through either the cable 13 or a cable 15. The electric motor may be mounted in any usual and desirable manner in the unit. Mounted in any suitable manner, either on the electric motor or on the depending portion 39, is an upwardly extending platform 41, which extends into the housing 17, as is clearly illustrated in FIG. 4 of the drawings. This platform 41 mounts a microswitch designated generally by the numeral 43 and the vertical shaft 45 of the electric motor operatively extends through this platform.

It will be recognized that the bottom of each unit 37 is provided with a pair of electric sockets for receiving the plugged ends of the electric cables 13–15.

One end wall 47 of the motor and operating assembly unit 37 is provided with an aperture 49 therein, and inwardly disposed relative to this aperture is a latch 51 which is of a material having a degree of flexibility and this latch 51, at one end thereof, is fixed to the end wall 47, in any suitable way, as by a screw and nut arrangement 53, and at its other end the latch 51 is provided with an outwardly extending mounting and latching nose 55. At the top of the end wall of the housing 37 which is opposite to the end wall 47, I provide an outwardly extending flange, 57 for a purpose which will be explained.

Consideration of FIG. 4 of the drawings clearly illustrates that when the unit 37 is operatively mounted within the housing 17, the mounting and latching nose 55 extends over and rests on one end flange 33 of the bottom of the housing 17, while the flange 57 extends over and rests on the opposite flange 33 of the bottom of the housing 17. Thus, it will be understood that with the unit 37 operatively mounted with the entire assembly, the portion 41 thereof will be disposed within the housing 17 while the portion 39 will depend therefrom. In order to remove the unit 37 from its operative position with the assembly, it is merely necessary to insert a thumb or finger into the aperture 49 and exert pressure upon the latch 51 to cause a rearward movement thereof so that the nose 55 will be removed from its supporting resting position on the flange 33. The end of the unit 37 which mounts the latch 51 may then be pulled downwardly so that the flange 57 slips off the supporting bottom flange 33 so that the entire unit may be removed from operative position within the housing 17.

Fixed in any suitable manner to the motor shaft 45 is a circular indexing disc 59, the disc 59 being mounted on the shaft 45, in position thereon so that it operates at a substantial distance above the top surface of the platform 41, and it will be clear that the microswitch 43 is mounted in any suitable manner on the top surface of the platform 41 and beneath the indexing disc 59. I provide a plurality of indexing pins designated generally by the numeral 61, each of such pins 61 being fixed to the indexing disc 59 at spaced points circumferentially therearound, adjacent to but radially inwardly removed from the periphery thereof. Each indexing pin 61, which is fixed in the indexing disc as described, extends through the disc to provide an upper extending feeder actuating portion 63, and a lower extending switch actuating portion 65. The purpose of these indexing pins will be described hereinafter.

Referring particularly to FIG. 2 of the drawings, wherein I have shown a unitary animal access cage and circular feed bin assembly, which I have designated in its entirety by the numeral 67. The animal access cage is of heptagonal configuration to provide seven sides. The animal access cage comprises an upper rim member 69 and a lower rim member 71, and between these rim members 69 and 71, on each of the seven sides of the animal access cage, I provide a plurality of feed access openings 73 which are separated one from the other by means of vertical bars 75 to prevent the entire animal from entering the feeder. I provide a circular series of feed bins which are formed by a frustum 77, the downwardly and outwardly extending wall of the frustrum 77 mounts a series of circumferentially spaced apart bin forming partitions 79. Such partitions 69 being fixed to the wall of the frustum in any suitable manner and extending outwardly therefrom to and in engagement with the rims 69 and 71 of the feed access cage at the angles thereof to provide the heptagonal configuration thereto. It will now be understood that the frustum and the bin forming partitions are mounted within the feed access cage 67, and the bottom edges of the frustum may be welded or otherwise fixed to the lower edge of the feed access cage so as to produce a unitary structure comprising the frustum, the partitions, and the feed access cage. The top 78 of the frustum may be closed, if desired.

While I have disclosed the feed access cage as being heptagonal, and since there are seven partitions extending from the frustum to each angle of the feed access cage to provide seven bins, it is to be distinctly understood that I may form the feed access cage, as for instance, as an octagon to provide eight bins, or I may so form these elements to provide a lesser or greater number of bins, and such construction will fall within the spirit and scope of my invention.

The frustum is formed with a bottom 81 which is fixed to the lower end of the interior hollow surface of the frustum in any suitable manner, and is of circular configuration. The bottom 81 of the frustum is provided with a circumferential series of apertures 83 therein which are spaced apart a distance equal to the spacing of the indexing pins 61, the number of apertures 83 being equal to the number of pins 61. The frustum, with its bin forming means, and the feed access cage are mounted on the indexing disc 59 by placing it so that the upper extending portion 63 of each pin 61 will extend through an aperture 83 in the bottom 81 of the frustum, so that, as will appear hereinafter, upon rotation of the indexing disc 59, the entire assembly 67 will be caused to rotate therewith.

The microswitch 43 which is mounted on the top surface of the platform 41 is operatively connected to the electric motor which is housed in the unit 37 by means of electric cables 85. The microswitch is provided with a resilient switch arm 87 which is adapted when urged toward the body of the microswitch to operate a switch plunger 89.

The microswitch 43 is mounted on, and in position on, the top surface of the platform 41 so that the switch arm 87 is in the path of the depending switch actuating portions 65 of the indexing pins 61, which pins travel in a circular path with the indexing disc 59, the direction as indicated by the arrow in FIG. 6 of the drawings.

While it is understood that the timer 11 may be set to function at any predetermined time arrival, for purposes of explanation and simplification, I shall hypothesize that the timer is set to function once in every 24 hours, since there are seven bins in the feeder unit, and I shall further hypothesize that each bin contains a full 24 hour supply of feed for a caged animal. Thus, with the entire arrangement so constructed, it will be apparent that each feeder will feed a 24 hour supply to each animal automatically, and that no attendant will be required to fill the feed bins more than one time a week.

With the timer functioning, as described above, at the end of a 24 hour interval, when a feed bin of the series of feed bins which is disposed opposite the cage has been consumed so that it is time for the next adjacent feed bin to be positioned opposite the cage for access thereto by the animal, the electric motor within each unit 37 will then be energized by the timer, and its shaft 45 rotated so that the indexing disc 59 will likewise be rotated to move the bins, whereupon the depending portions 65 of a pin 61, which is the pin 61 at the leading edge of the next adjacent filled bin to the consumed bin, will be brought into position engaging the switch arm 87 and forcing it into actuating position against switch plunger 89 to push the plunger 89 in retracted position to open the microswitch to thereby deenergize the electric motor within the unit 37 to stop rotation of the disc 59 and the assembly 67. The depending portion of the pin will, as the motor is stopping, slip past switch arm 87, to permit it and plunger 89 to assume their normal positions, so that the microswitch is open and rotation may occur at the end of the next twenty four hour period under the operation of the timer. It will thus be apparent that a filled feed bin will now be in position for consuming access by the caged animal for a 24 hour period. The caged animal may project his head through the vertical bars 3 of the cage and through the opening 73 in the feed access cage for eating the feed material which is contained within the bin. It will also be appreciated that due to the shape of the frustum 77, which forms the inner wall of each bin, the feed material will slide and be urged outwardly toward the feed access cage so that the animal may easily reach it. At the end of a 24 hour period the bin from which the caged animal has been eating will be empited, the timer will again operate and the same cycle will again be gone through whereby the portion 65 of the next pin 61 will again operate the switch arm 87 and the plunger 89.

Each end wall 23 of the housing 17 is slotted as at 91 and I provide an elongated closure bar 93 which is slidably mounted in the slots and extends between the end walls 23 and is of greater length than the length of the housing 47, so that each end of this sliding bar extends outwarlly beyond the end walls of the housing 17. The sliding closure bar 93 is provided with an aperture 95 therein which is of the same dimensions as those of the aperture 29 in the rear wall 21 of the housing 17. Thus, when the sliding bar is in the position illustrated in FIG. 3 of the drawings the apertures 29 and 95 are in alignment to permit the caged animal to have access to the feed in the bin which is positioned adjacent and opposite to these aligned apertures 29 and 95. When all of the bins are emptied of feed at the end of a 24 hour period so that they must be filled, the attendant merely slides each sliding bar 93 to move the aperture 95 out of alignment with the aperture 29 so that the caged animal does not have access to the feeder. When this is done the attendant opens each feeder by opening the top 25 thereof and fills the bins of each feeder with feed. When this is completed all of the tops 25 are closed and the sliding bar is operated so that the apertures 29 and 95 are in alignment to permit the animal to have access to the feed within the bin which is opposite these apertures.

I claim:

1. An automatic feeder for a caged animal including, in combination, a rotatable circular series of separate feed bins, each adapted to hold sufficient food for a predetermined time period, means for attaching said circular series of separate feed bins to a cage in which the animal to be fed is confined, the feeder being attached to the cage to position one of said circular series of separate feed bins one at a time in position for eating access by the animal, and automatic operating means operatively connected to said circular series of separate feed bins and causing rotation thereof at the end of a predetermined time period to bring the next adjacent bin into position for eating access by the animal, and further means operating by rotation of said circular series of separate feed bins to stop rotation thereof when said next adjacent feed bin is in position for eating access by the animal.

2. An automatic feeder in accordance with claim 1, wherein said automatic operating means includes a motor operatively connected to an indexing disc rotatable by operation of said motor, and said circular series of operating feed bins being mounted on and rotatable with said indexing disc.

3. An automatic feeder in accordance with claim 2, wherein said indexing disc is provided with a plurality of indexing pins and said circular series of separate feed bins ade mounted on said indexing pins.

4. An automatic feeder in accordance with claim 3, wherein the number of feed bins in said circular series of separate feed bins is the same as the number of indexing pins.

5. An automatic feeder in accordance with claim 3, wherein said indexing pins extend through said indexing disc and extend beyond the upper and lower surfaces thereof, and said circular series of separate feed bins are mounted on the portion of the indexing pins which extend above the indexing disc, and the portions of the pins which extend below said indexing disc engage and operate said further means.

6. An automatic feeder in accordance with claim 1 wherein, a housing is provided for said automatic operating means and said further means is mounted on the top of said housing and below said circular series of separate feed bins.

7. An automatic feeder in accordance with claim 6 wherein, an indexing disc is provided and said indexing disc is operatively connected to said operating means, and said further means is positioned on the top of said housing and below said indexing disc.

8. An automatic feeder in accordance with claim 1 wherein, said rotatable circular series of separate feed bins is provided with a poly-sided feed access member surrounding said circular series of separate feed bins and affixed thereto.

9. An automatic feeder in accordance with claim 1 wherein, said rotatable circular series of separate feed bins is formed by a frustum providing an inclined floor for each feed bin, a poly-sided feed access member surrounding said feed bins and fixed thereto, and a plurality of bin forming partitions extending from said frustum to said feed access member, and being circumferentially spaced apart about said frustum.

10. An automatic feeder in accordance with claim 6 wherein said housing has end walls and a rear wall, and said rear wall has an access opening therein, and means slidably mounted on said housing and operable to open and close said access opening.

11. An automatic feeder in accordance with claim 10 wherein said means is provided with an opening therein and said means is operable to align said opening with said access opening and is operable to misalign said openings.

References Cited
UNITED STATES PATENTS

| | | | |
|---|---|---|---|
| 1,989,298 | 1/1935 | Tingley | 119—51.13 X |
| 2,500,243 | 3/1950 | Dixon | 119—51.13 |
| 2,528,742 | 11/1950 | Coffing | 119—51.12 |
| 3,050,029 | 8/1962 | Appleton | 119—51.13 |
| 3,180,316 | 4/1965 | Chatfield et al. | 119—51.12 |
| 3,340,851 | 9/1967 | Frank et al. | 119—51.13 |

FOREIGN PATENTS

| | | |
|---|---|---|
| 198,188 | 1908 | Germany. |

ALDRICH F. MEDBERY, Primary Examiner